United States Patent
Seo et al.

(10) Patent No.: US 9,105,977 B2
(45) Date of Patent: Aug. 11, 2015

(54) TERMINAL DEVICE HAVING META-STRUCTURE

(71) Applicant: Soongsil University-Industry Cooperation Foundation, Seoul (KR)

(72) Inventors: Chul Hun Seo, Seoul (KR); Chongmin Lee, Seoul (KR); Hyoungjun Kim, Seoul (KR)

(73) Assignee: SOONGSIL UNIVERSITY-INDUSTRY COOPERATION FOUNDATION, Seoul (KR)

( * ) Notice: Subject to any disclaimer, the term of this patent is extended or adjusted under 35 U.S.C. 154(b) by 258 days.

(21) Appl. No.: 13/961,053

(22) Filed: Aug. 7, 2013

(65) Prior Publication Data

US 2014/0043194 A1 Feb. 13, 2014

(30) Foreign Application Priority Data

Aug. 9, 2012 (KR) .......................... 10-2012-0087444

(51) Int. Cl.
*H01Q 1/24* (2006.01)
*H01Q 17/00* (2006.01)
*H01Q 15/00* (2006.01)
*H02J 17/00* (2006.01)

(52) U.S. Cl.
CPC ............... *H01Q 17/00* (2013.01); *H01Q 1/245* (2013.01); *H01Q 15/0086* (2013.01); *H01Q 17/008* (2013.01); *H02J 17/00* (2013.01)

(58) Field of Classification Search
USPC .......................................... 343/702, 756, 909
See application file for complete search history.

(56) References Cited

U.S. PATENT DOCUMENTS

| | | | | |
|---|---|---|---|---|
| 8,081,138 | B2 * | 12/2011 | Wu et al. ........................ | 343/873 |
| 2011/0304521 | A1 * | 12/2011 | Ando et al. .................... | 343/893 |
| 2012/0242556 | A1 * | 9/2012 | Ando ............................ | 343/834 |
| 2014/0042971 | A1 * | 2/2014 | Seo et al. ...................... | 320/114 |
| 2014/0062214 | A1 * | 3/2014 | Seo et al. ...................... | 307/104 |
| 2014/0062215 | A1 * | 3/2014 | Seo et al. ...................... | 307/104 |

OTHER PUBLICATIONS

Yuandan Dong et al., "Promising Future of Metamaterials", IEEE Microwave Magazine, vol. 13, Mar./Apr. 2012.
Christophe Caloz et al., "Electromagnetic Metamaterials: Transmission Line Theory and Microwave Applications".
Tatsuo Itoh et al., "Invited paper:Prospects for metamaterials", Electronics Letters, vol. 40, No. 16, Aug. 5, 2004.

* cited by examiner

*Primary Examiner* — Tan Ho
(74) *Attorney, Agent, or Firm* — Bacon & Thomas, PLLC

(57) ABSTRACT

A terminal device includes a housing, a communication antenna, and an agglomerative meta-structure, wherein the agglomerative meta-structure comprises a first pattern layer connected in series between an input end and an output end of the agglomerative meta-structure, and a second pattern layer connected in parallel between the input end and the output end.

20 Claims, 14 Drawing Sheets

TERMINAL DEVICE HAVING META-STRUCTURE

RELATED APPLICATIONS

This application claims the benefit of Korean Patent Application No. 10-2012-0087444, filed on Aug. 9, 2012, which is hereby incorporated by reference as if fully set forth herein.

FIELD OF THE INVENTION

The present invention relates to a terminal device having communication capability and multimedia capabilities, and, more particularly, to a terminal device having a meta-structure that is suitable for absorbing and shielding radio wave power radiated to the outside by using a radio wave absorber applying the meta-structure.

BACKGROUND OF THE INVENTION

In general, radio wave absorbers are mainly used in a stealth technology to make it difficult to detect by radar and a technology to detect effectively a weak radio wave signal for the purpose of communications or broadcasting using the same. The stealth technology may refer to that it is closest to materials engineering of using the absorbing material. In the case of using a radio wave absorber for a communication or broadcasting, a technique using ferrite materials or ferromagnetic materials is mainly utilized for the purpose of trying to enhance the strength of the radio waves.

These techniques have to use the expensive materials having an absorption property of absorbing the radio waves. Further, these techniques have a difficulty of putting to practical use since chemical components and the molecular structure of the material are concealed as a security technique mainly and also have a very narrow field of usage.

On the other hand, meta-materials collectively refer to substances that are artificially synthesized to exhibit special electromagnetic properties that are not common in nature.

The radio waves in most materials are propagated in compliance with the right-hand rule of the vector fields E, H, and $\beta$, where E is an electric field, H is a magnetic field and $\beta$ is a wave vector. The direction of the phase velocity is the same as the direction of energy signal propagation (group velocity), and the refractive index is a positive number. The material having the above properties refers to as a Right Handed (RH) material. Most natural materials are RH materials. Artifacts are also the RH materials.

The meta-material has an artificial structure. When the meta-material is designed a structural average unit cell size 'p' much smaller than the wavelength of electromagnetic energy that is guided by the meta-material, the meta-material can behavior like as a homogeneous medium with respect to the electromagnetic energy being guided. Unlike the RH material, the meta-material may represent a negative refractive index in which the relative direction of the vector fields (E, H, $\beta$) becomes opposite to the direction of the energy propagation and phase velocity of signals that comply with the left-hand rule. The meta-material that supports only the negative refractive index is a Left Handed (LH) meta-material.

Many of the meta-materials are a mixture of the LH meta-materials and RH meta-materials and, therefore, are a Composite Right and Left Handed (CRLH) meta-materials. A CRLH meta-material may exhibit a property of an RH meta-material at a high frequency and a property of an LH meta-material at the low-frequency. The design and attribute for the CRLH meta-materials are disclosed by Christophe Caloz and Tatsuo Itoh, "Electromagnetic Metamaterial: Transmission Line Theory and microwave applications" John Wiley & Sons, 2006. The CRLH meta-materials and their applications in antennas are disclosed by Tatsuo Itoh, "invited paper: Prospects for Metamaterials", E-Journal, Volume 40, No. 16, August 2004. Both of which are hereby incorporated by reference as if fully set forth herein.

The CRLH meta-materials may be organized and processed to represent the electromagnetic attributes that are produced for special purposes to use in applications where it is difficult or impractical or impossible to use other materials. Further, the CRLH meta-materials may also be used to develop new applications and organize new elements that are not possible with the RH meta-materials.

SUMMARY OF THE INVENTION

In view of the above, the present invention provides a technique capable of shielding leakage radio waves occurring in a terminal device by employing a meta-structure having a radio wave absorption capability in a mobile terminal, etc. and minimizing an effect on a human body by electromagnetic waves occurred from the terminal device.

Further, the present invention provides a technique capable of combining an electromagnetic wave agglomeration function with a wireless power collection function by coupling the meta-structure with a wireless power transmission system.

In accordance with an embodiment of the present invention, there is provided a terminal device, which includes: a housing; a communication antenna installed in a first region in the housing and configured to transmit and receive electromagnetic waves; and an agglomerative meta-structure installed in a second region spaced from the first region in the housing and configured to agglomerate the electromagnetic waves received from the communication antenna, wherein the agglomerative meta-structure comprises: a first pattern layer connected in series between an input end and an output end of the agglomerative meta-structure; and a second pattern layer connected in parallel between the input end and the output end.

In the exemplary embodiment, wherein the first pattern layer has an equivalent circuit, wherein the equivalent circuit comprises: a first inductor; a first capacitor connected in series to the first inductor; a second capacitor connected in series to the first capacitor; and a second inductor connected in series to the second capacitor, wherein the second pattern layer comprises: a third capacitor connected in parallel between the first capacitor and the second capacitor; and a third inductor connected in series to the third capacitor.

In the exemplary embodiment, wherein the first pattern layer comprises: an edge pattern formed along the inside of an outer surface of the agglomerative meta-structure; and extended patterns extending from given points or corners of the respective sides of the edge pattern toward the inside of the agglomerative meta-structure.

In the exemplary embodiment, wherein the extended patterns have extended ends that are centered on a middle of the agglomerative meta-structure and are faced to one another.

In the exemplary embodiment, wherein each of the extended patterns has a concave-convex structure.

In the exemplary embodiment, wherein the agglomerative meta-structure comprises: an edge pattern formed along the inside of an outer surface of the agglomerative meta-structure; extended patterns extending from the corners of the edge pattern toward the inside of the agglomerative meta-structure; and at least one inner pattern connected to each of the extended patterns.

In the exemplary embodiment, wherein the agglomerative meta-structure comprises: an edge pattern formed along the inside of an outer surface of the agglomerative meta-structure; first extended patterns extending from given points on respective sides of the edge pattern toward the inside of the agglomerative meta-structure; and second extended patterns extending from the corners of the edge pattern toward the inside of the agglomerative meta-structure.

In the exemplary embodiment, wherein the agglomerative meta-structure comprises: an edge pattern formed along the inside of an outer surface of the agglomerative meta-structure; first extended patterns extending from given points on respective sides of the edge pattern toward the inside of the agglomerative meta-structure; second extended patterns extending from the corners of the edge pattern toward the inside of the agglomerative meta-structure; and at least one inner pattern connected to each of the second extended patterns.

In the exemplary embodiment, wherein the agglomerative meta-structure comprises: an edge pattern formed along the inside of an outer surface of the agglomerative meta-structure; first extended patterns extending from given points on sides of the edge pattern toward the inside of the agglomerative meta-structure; second extended patterns extending from corners of the edge pattern toward the inside of the agglomerative meta-structure; and at least one inner pattern connected to each of the second extended patterns, the inner pattern having a plurality of unit-cell structures.

In the exemplary embodiment, wherein the extended patterns have extended ends that are centered to a middle of the agglomerative meta-structure and are faced to one another.

In the exemplary embodiment, wherein the inner patterns have extended ends that are centered to a middle of the agglomerative meta-structure and are faced to one another.

In the exemplary embodiment, wherein the inner patterns have a type of a square, and each of the extended ends is configured to extend from a corner of the square.

In the exemplary embodiment, wherein the first extended patterns have extended ends that are centered to a middle of the agglomerative meta-structure and are faced to one another.

In the exemplary embodiment, wherein the second extended patterns have a concave-convex structure.

In the exemplary embodiment, wherein the agglomerative meta-structure comprises: an edge pattern formed along the inside of an outer surface of the agglomerative meta-structure; extended patterns extending from respective corners or given points on respective sides of the edge pattern toward the inside of the agglomerative meta-structure; and inner patterns in the shape of a spiral connected to the extended patterns or connected to on at least two points on the extended patterns having a plurality of unit cell structures.

In the exemplary embodiment, wherein spaces between the inner patterns are configured to induce capacitance.

In the exemplary embodiment, wherein the agglomerative meta-structure has a property that either a dielectric constant or permeability is negative.

In the exemplary embodiment, wherein the second pattern layer has slit patterns or a circular pattern of an engraved form.

In the exemplary embodiment, wherein the slit patterns are formed by patterning pairs of at least two slit patterns so that the two slits are facing each other with a space between them.

In the exemplary embodiment, wherein the at least two patterns are configured to face saw-toothed shapes being put on the opposite sides.

In the exemplary embodiment, wherein the at least two patterns are configured to face concave-convex forms being put on the opposite sides.

In the exemplary embodiment, further comprising a wireless power transceiving unit.

In the exemplary embodiment, wherein the wireless power transceiving unit comprises: a collective meta-structure configured to collective wireless power received from an outside; and a charging antenna arranged between the collective meta-structure and the agglomerative meta-structure and configured to charge the wireless power.

As described above, the embodiment has merit in that the meta-structure is designed to have a property of absorbing a specific frequency band, which do not deform the expensive materials and the molecular structure of the expensive materials incorporated in an existing absorber. Further, particular patterns are engraved or embossed on a dielectric substrate for common use in circuits to have the characteristics of the meta-electromagnetic wave structure, which do not incur any problems in processes and practical uses and widespread use of technologies. In particular, since the embodiment enables to minimize the effect on the human body by the radio waves radiated from wireless communication electronic devices, radio communication electronic devices harmless to the human body may be implemented when it is applied to packaging technologies or the like. Besides, in addition to the meta-structure for the electromagnetic wave agglomeration, the embodiment further provides a collective meta-structure for transmitting the wireless power, which can be readily applied to a terminal device having a wireless power transmission technique applied thereto.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

The advantages and features of exemplary embodiments of the present invention and methods of accomplishing them will be clearly understood from the following description of the embodiments taken in conjunction with the accompanying drawings. However, the present invention is not limited to those embodiments and may be implemented in various forms. It should be noted that the embodiments are provided to make a full disclosure and also to allow those skilled in the art to know the full scope of the present invention. Therefore, the present invention will be defined only by the scope of the appended claims.

In the following description, well-known functions or constitutions will not be described in detail if they would unnecessarily obscure the embodiments of the invention. Further, the terminologies to be described below are defined in consideration of functions in the invention and may vary depending on a user's or operator's intention or practice. Accordingly, the definition may be made on a basis of the content throughout the specification.

Before describing the embodiment of the present invention, it is noted that the embodiment invention provides a technique of absorbing external radio waves by using a radio wave absorber of electromagnetic wave structure, and more particular, the embodiment is intended to implement an a wireless power collection function and electromagnetic wave agglomeration function by incorporating a meta-structure for agglomerating the electromagnetic waves in a terminal device to which a wireless power transmission technique is applied, whereby the object of the present invention will be achieved easily from the technical idea.

Figure 1:
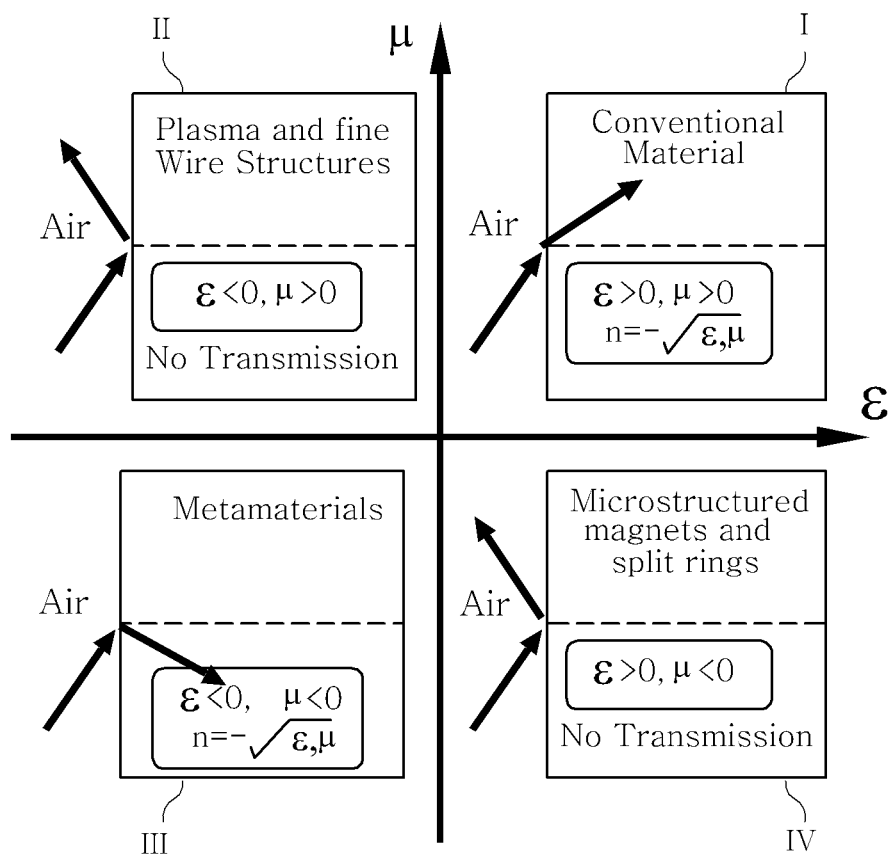
FIG. 1 is a diagram explaining a property of a meta-structure in accordance with an embodiment of the present invention.

First, in terms of the meta-electromagnetic wave structure applicable to the embodiments of the present invention, as shown in FIG. 1, most materials in the natural world are present in a first quadrant I and have positive values in both effective dielectric constant and effective permeability that show the properties of the materials. In a case where a radio wave is incident on a material present in one quadrant, the radio wave refracts and proceeds in compliance with the Snell's law.

For materials that are present in a second quadrant II, an effective dielectric constant has a negative value while the effective permeability has a positive value. These materials have a property that a radio wave incident on these materials is absorbed and vanished in accordance with the absorption the traveling distance of the radio wave without proceeding further.

Materials present in a third quadrant III have a property that both an effective dielectric constant and an effective permeability have a negative value. Further, a radio wave incident on these materials transmits at a particular frequency band, but it proceeds with a 180° phase difference between phase velocity and group velocity. Further, the materials exhibit that the radio wave is absorbed at the other frequency bands with the exception of the particular frequency band or vanished depending on the travelling distance of the radio wave.

For materials that are present in a fourth quadrant IV, an effective dielectric constant has a positive value while an effective permeability has a negative value. The materials typically include ferrites, etc. and have properties that a radio wave incident on these materials is transmitted and absorbed without further propagation or vanished depending on the traveling distance of the radio wave. Therefore, it is possible to design a material to get the same property of the materials present in the first, second, third and fourth quadrants in a specific frequency band. This is just such characteristic of the material, but is not such a material per se.

The meta-electromagnetic wave structure that is proposed in the embodiments of the present invention is intended to mean a structure designed to have a meta-radio wave property.

Hereinafter, the embodiments of the present invention will be described in detail with reference to the accompanying drawings.

Figure 2:
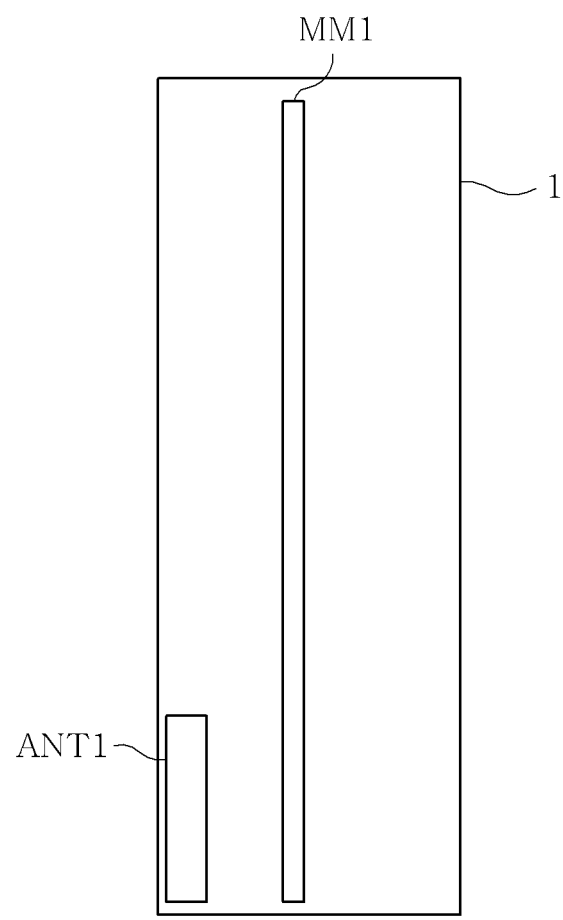
FIG. 2 is a schematic block diagram of a terminal device having the meta-structure in accordance with an embodiment of the present invention.

FIG. 2 is a schematic block diagram of a terminal device having a meta-structure in accordance with an embodiment of the present invention. The terminal device includes a housing 1, a communication antenna ANT1, and an agglomerative meta-structure MM1.

First, the terminal device applied to an embodiment shown in FIG. 2 may include a variety type of communication terminals or multimedia terminals such as smart phones, notepads, Bluetooth receivers or the like. However, it should be noted that these terminal devices are merely illustrative devices for the explanation purpose of the embodiments, and the embodiments are not limited to such particular terminal devices.

As shown in FIG. 2, the housing 1 is responsible for accommodating the terminal device and may typically refer to a frame in the shape of a box enclosing the terminal device.

The communication antenna ANT1 is installed in a given region in the housing 1 to receive and transmit electromagnetic waves.

The communication antenna ANT1 may include, but is not limited to, an antenna for use in wide area communications such as WCDMA (Wideband Code Division Multiple Access), LTE (Long Term Evolution) and the like and an antenna for use in local area communications such as Wi-Fi (Wireless Fidelity), Bluetooth and the like, inclusive of a communication antenna for use in a specific function.

The agglomerative meta-structure MM1, which is applied to the embodiment of the present invention, is installed in another region spaced by a prefixed distance from the given region within the housing 1 to agglomerate the electromagnetic waves received from the communication antenna ANT1.

FIGS. 3 to 13 illustrate front patterns in the meta-structure, particularly, the agglomerative meta-structure MM1 applied to the terminal device in accordance with an embodiment of the present invention.

Figure 3:
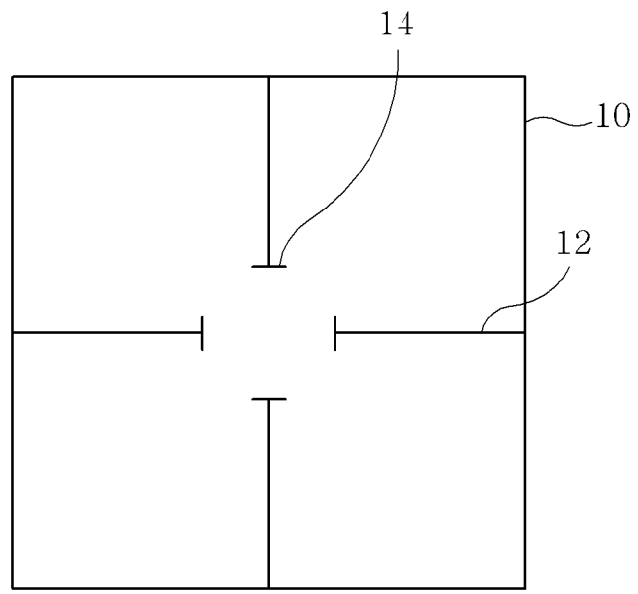
FIGS. 3 to 13 show examples of front patterns of the meta-structure applied to a terminal device in accordance with an embodiment of the present invention.

First, FIG. 3 illustrates a plan view of an example of the front pattern for the agglomerative meta-structure MM1. The front pattern includes an edge pattern 10 formed along the inside of an outer surface of the agglomerative meta-structure MM1 and extended patterns 12 in the shape of a straight line extending from a given point of the respective sides of the edge pattern 10 toward the inside or the middle of the agglomerative meta-structure MM1.

The extended patterns 12 have extended ends 14 coupled to their corresponding distal ends that are centered in the middle of the agglomerative meta-structure MM1 and are faced to one another. In the embodiment, the extended patterns 12 have an inductance (L) component and the extended ends 14 have a conductance (C) component.

Figure 4:
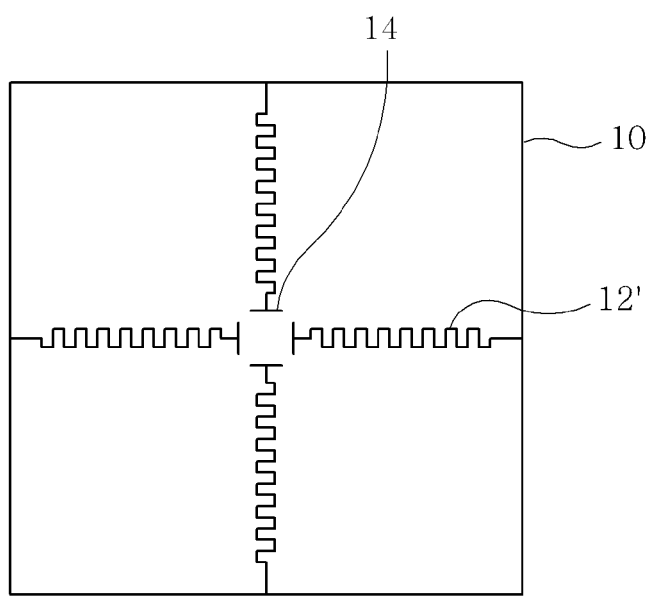

FIG. 4 illustrates a plan view of another example of the front pattern for the agglomerative meta-structure MM1, which is substantially identical to that illustrated in FIG. 3 and is characterized in that the extended patterns 12 have a concave-convex structure. In FIG. 4, a reference numeral 12' represents the extended patterns with the concave-convex structure in lieu of the shape of a straight line.

Figure 5:
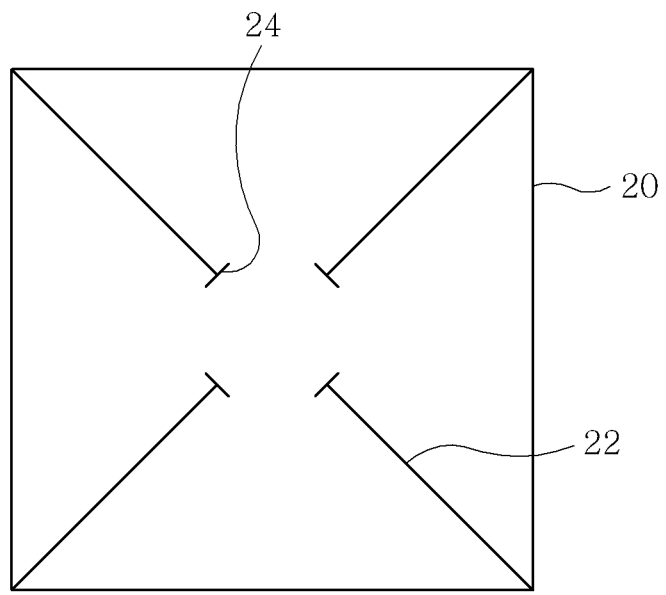

FIG. 5 illustrates a plan view of another example of the front pattern for the agglomerative meta-structure MM1. The front pattern includes an edge pattern 20 formed along the inside of an outer surface of the agglomerative meta-structure MM1 and extended patterns 22 extending from the corners of the edge pattern 20 to the inside or the middle of the agglomerative meta-structure MM1.

The extended patterns 22 have extended ends 24 coupled to their corresponding distal ends that are centered in the middle of the agglomerative meta-structure MM1 and are faced to one another. In the embodiment, the extended patterns 22 have an inductance (L) component and the extended ends 24 have a conductance (C) component.

Figure 6:
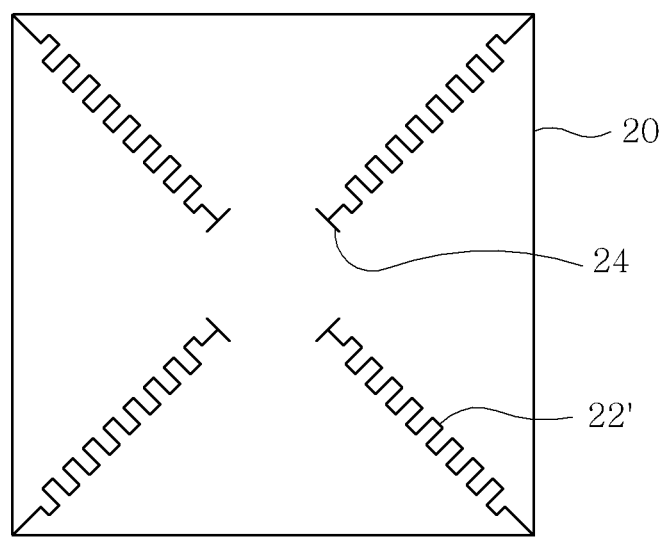

FIG. 6 illustrates a plan view of another example of the front pattern for the agglomerative meta-structure MM1, which is substantially identical to that illustrated in FIG. 5 and characterized in that the extended patterns 12 have a concave-convex structure. In FIG. 6, a reference numeral 22' represents the extended pattern with the concave-convex structure in lieu of the shape of a straight line.

Figure 7:
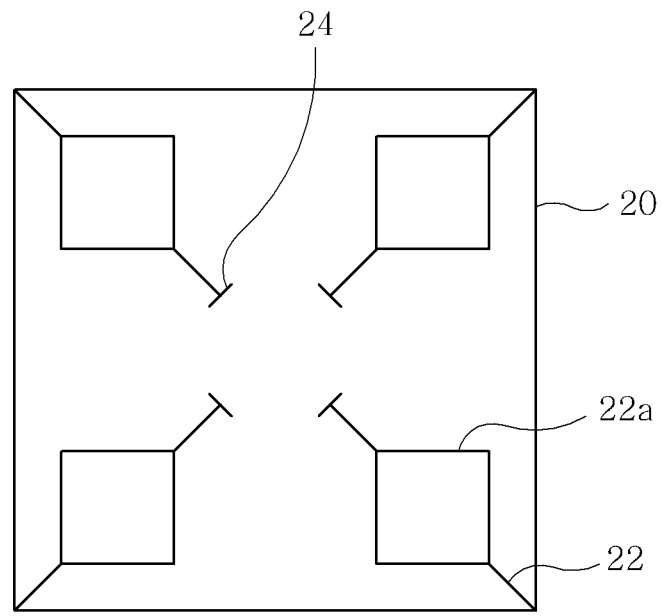

FIG. 7 illustrates a plan view of another example of the front pattern for the agglomerative meta-structure MM1. The front pattern includes an edge pattern 20 formed along the inside or the middle of an outer surface of the agglomerative meta-structure MM1 and extended patterns 22 in the shape of straight line extending from the corners of the edge pattern 20 to the inside of the agglomerative meta-structure MM1. Further, the front pattern includes at least one inner pattern 22a coupled to each of the extended patterns 22.

The extended patterns 22 have extended ends 24 coupled to their corresponding distal ends that are centered in the middle of the agglomerative meta-structure MM1 and are faced to one another. In the embodiment, the extended patterns 22 have an inductance (L) component and the extended ends 24 have a conductance (C) component.

In addition, the inner patterns 22a in FIG. 7 have a type of a square, and the extended ends 24 are directly coupled with the extended patterns 22 or coupled to the corners of the squares.

Figure 8:
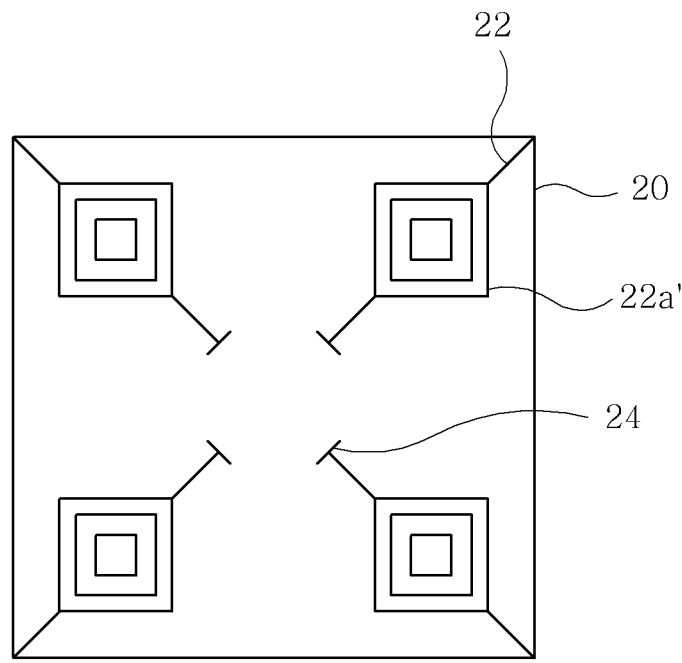

FIG. 8 illustrates a plan view of another example of the front pattern for the agglomerative meta-structure MM1. The front pattern includes an edge pattern 20 formed along the inside or the middle of an outer surface of the agglomerative meta-structure MM1 and extended patterns 22 extending from the corners of the edge pattern 20 to the inside of the agglomerative meta-structure MM1. Further, the front pattern includes at least one inner pattern 22a coupled to each of the extended patterns 22, the inner pattern having a plurality of unit-cell structures.

The extended patterns 22 have extended ends 24 coupled to their corresponding distal ends that are centered in the middle of the agglomerative meta-structure MM1 and are faced to one another. In the embodiment, both the extended patterns 22 and the inner patterns 22a' have an inductance (L) component, and the extended ends 24 have a conductance (C) component.

In addition, the inner patterns 22a in FIG. 8 have a type of a square, and each of the extended ends 24 is directly coupled to an extended pattern 22 or coupled to a corner of the square.

In FIG. 8, the inner patterns 22a' have the plurality of unit-cell structures and, therefore, the spaces between the unit-cells may induce a coupling capacitance.

Figure 9:
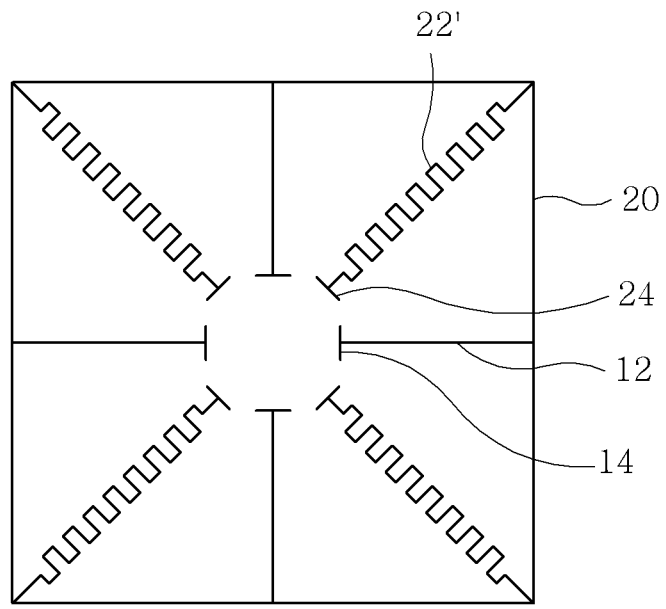

FIG. 9 illustrates a plan view of another example of the front pattern for the agglomerative meta-structure MM1. The front pattern includes an edge pattern 20 formed along the inside of an outer surface of the agglomerative meta-structure MM1, first extended patterns 12 extending from a given point of the respective sides of the edge pattern 20 to the inside or the middle of the agglomerative meta-structure MM1, and second extended patterns 22' extending from the corners of the edge pattern 20 to the inside or the middle of the agglomerative meta-structure MM1.

The first extended patterns 12 have first extended ends 14 coupled to their corresponding distal ends that are centered in the middle of the agglomerative meta-structure MM1 and are faced to one another. In the embodiment, the first extended patterns 12 have an inductance (L) component, and the first extended ends 14 have a conductance (C) component.

Further, the second extended patterns 22' have a concave-convex structure. In similar to the first extended patterns, the second extended patterns 22' have second extended ends 24 coupled to their corresponding distal ends that are centered in the middle of the agglomerative meta-structure MM1 and are faced to one another. In an embodiment, the second extended patterns 22' have an inductance (L) component, and the second extended ends 24 have a conductance (C) component.

The first extended ends 14, which is coupled to the first extended pattern 12, and the second extended ends 24, which is connected to the second extended patterns 22', may allow of securing a high capacitance.

Figure 10:
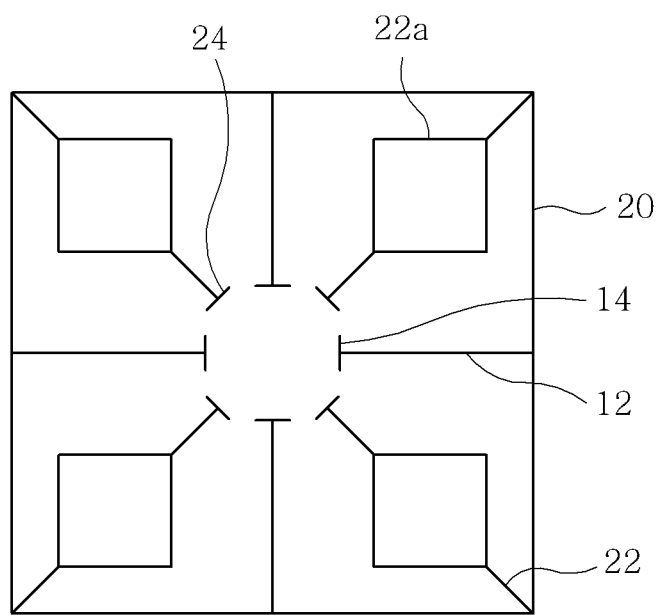

FIG. 10 illustrates a plan view of another example of the front pattern for the agglomerative meta-structure MM1.

The front pattern includes an edge pattern 20 formed along the inside of an outer surface of the agglomerative meta-structure MM1, first extended patterns 12 extending from a given point of the respective sides of the edge pattern 20 to the inside or the middle of the agglomerative meta-structure MM1, and second extended patterns 22 extending from the corners of the edge pattern 20 to the inside of the agglomerative meta-structure MM1. Further, the front pattern includes at least one inner pattern 22a' coupled to each of the second extended patterns 22.

The first extended patterns 12 have first extended ends 14 coupled to their corresponding distal ends that are centered in the middle of the agglomerative meta-structure MM1 and are faced to one another. In the embodiment, the first extended patterns 12 have an inductance (L) component and the first extended ends 14 have a conductance (C) component.

Similarly, the second extended patterns 22 have second extended ends 24 coupled to their corresponding distal ends that are centered in the middle of the agglomerative meta-structure MM1 and are faced to one another. In the embodiment, the second extended patterns 22 have an inductance (L) component and the second extended ends 24 have a conductance (C) component.

The first extended ends 14, which is coupled to the first extended pattern 12, and the second extended ends 24, which is connected to the second extended patterns 22', may allow of securing a high capacitance.

In addition, the inner patterns 22a in FIG. 10 have a type of a square, and each of the extended ends 24 is directly coupled to a second extended pattern 22 or coupled to a corner of a square inner pattern 22a.

Figure 11:
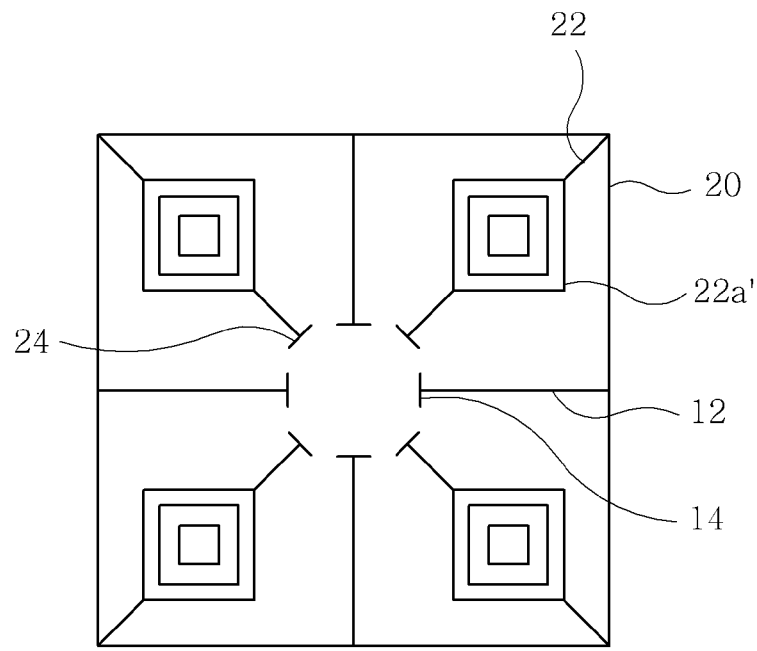

FIG. 11 illustrates a plan view of another example of the front pattern for the agglomerative meta-structure MM1. The front pattern includes an edge pattern 20 formed along the inside of an outer surface of the agglomerative meta-structure MM1, first extended patterns 12 extending from a given point of the respective sides of the edge pattern 20 to the inside or the middle of the agglomerative meta-structure MM1, and second extended patterns 22 extending from the corners of the edge pattern 20 to the inside or the middle of the agglomerative meta-structure MM1. Further, the front pattern includes at least one inner pattern 22a' coupled to each of the second extended patterns 22, the inner pattern having a plurality of unit-cell structures.

As illustrated in FIG. 11, the first extended patterns have first extended ends 14 coupled to their corresponding distal ends that are centered in the middle of the agglomerative meta-structure MM1 and are faced to one another. In the embodiment, the first extended patterns 12 have an inductance (L) component, and the first extended ends 14 have a conductance (C) component.

Similarly, the second extended patterns 22 have second extended ends 24 coupled to their corresponding distal ends that are centered in the middle of the agglomerative meta-structure MM1 and are faced to one another. In the embodiment, both the second extended patterns 22 and the inner patterns 22a' have an inductance (L) component, and the second extended ends 24 have a conductance (C) component.

The first extended ends 14 coupled to the first extended pattern 12 and the second extended ends 24 connected to the second extended patterns 22' may allow of securing a high capacitance.

In addition, the inner patterns 22a' in FIG. 11 have a type of a square, and each of the extended ends 24 is directly coupled to a second extended pattern 22 or coupled to a corner of a square inner pattern 22a'.

In FIG. 11, the inner patterns 22a' have the plurality of unit-cell structures and, therefore, the spaces between the unit-cells may induce a coupling capacitance.

Figure 12:
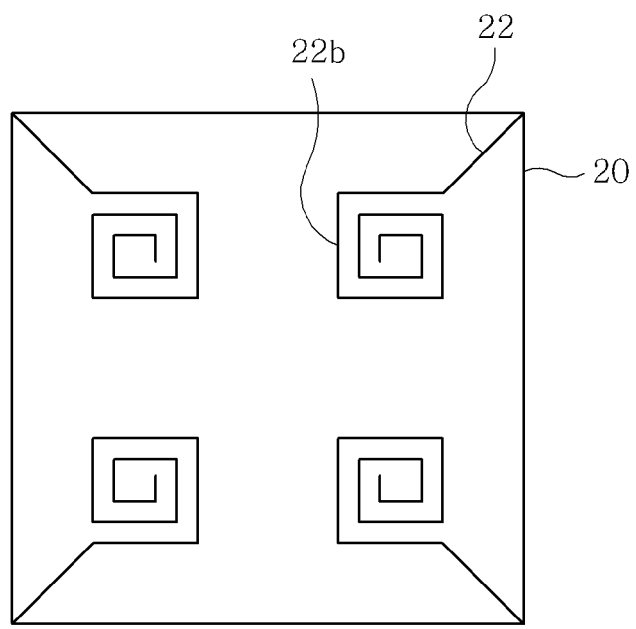

FIG. 12 illustrates a plan view of another example of the front pattern for the agglomerative meta-structure MM1. The front pattern includes an edge pattern 20 formed along the inside of an outer surface of the agglomerative meta-structure MM1, extended patterns 22 extending from the corners of the edge pattern 20 to the inside or the middle of the agglomerative meta-structure MM1, and inner patterns 22b in the shape of spiral coupled with the extended patterns 22.

In FIG. 12, the elements of each inner pattern 22b are spaced by a distance and the space between the elements of the inner pattern 22b may induce a capacitance component. Therefore, in the embodiment illustrated in FIG. 12, it is possible to secure the capacitance component without forming additional extended ends.

Figure 13:
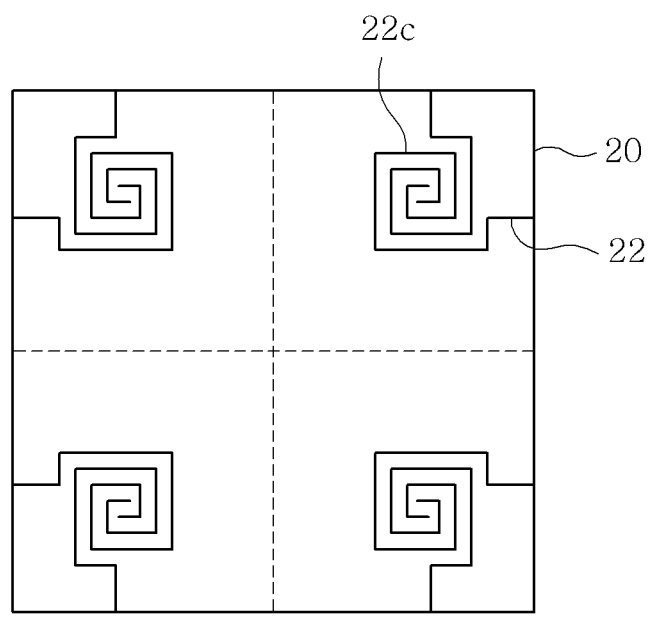

FIG. 13 illustrates a plan view of another example of the front pattern for the agglomerative meta-structure MM1. The front pattern includes an edge pattern 20 formed along the inside of an outer surface of the agglomerative meta-structure MM1, extended patterns 22 extending from a given point of the respective sides of the edge pattern 20 to the inside or the middle of the agglomerative meta-structure MM1, and inner patterns 22c having a shape of a spiral coupled to two points of the respective extended patterns 22.

In FIG. 13, the inner patterns 22c are spaced by a distance, and the space between the inner patterns 22c may induce a capacitance component. Therefore, in the embodiment illustrated in FIG. 13, it is possible to secure the capacitance component without forming additional extended ends.

Figure 14:
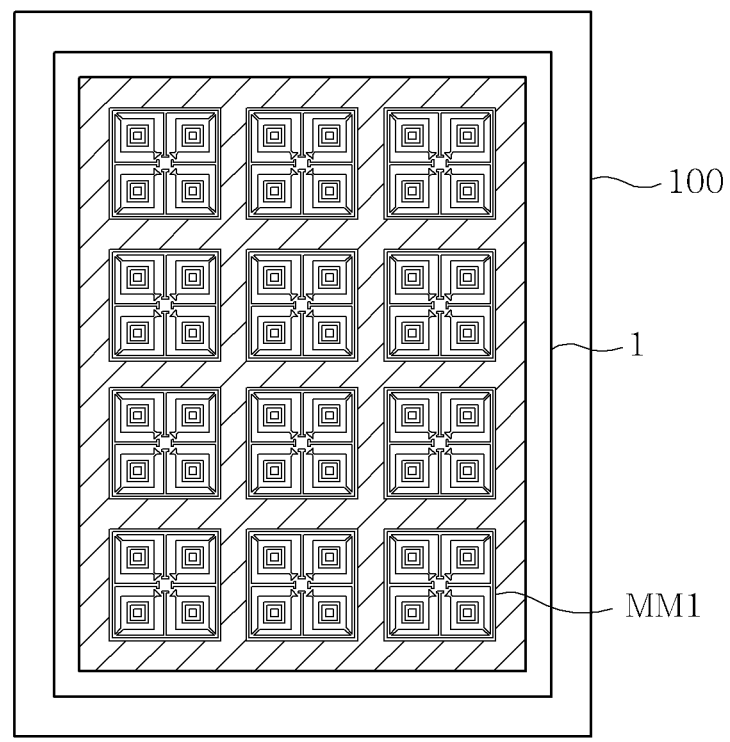
FIG. 14 depicts a case where the pattern of the meta-structure shown in FIG. 11 is substantially applied to a terminal device.

FIG. 14 depicts a case where a terminal device to which the pattern of the meta-structure shown in FIG. 11 is substantially applied.

As shown in FIG. 14, a plurality of the agglomerative meta-structures MM1 may be formed in the housing 1 of a terminal device 100. In this embodiment of the present invention, for example, the terminal device 100 may be implemented to have the meta-structures of 3×4 matrixes.

FIGS. 15 to 19 show examples of rear patterns of the meta-structure applied to a terminal device in accordance with an embodiment of the present invention.

Figure 15:
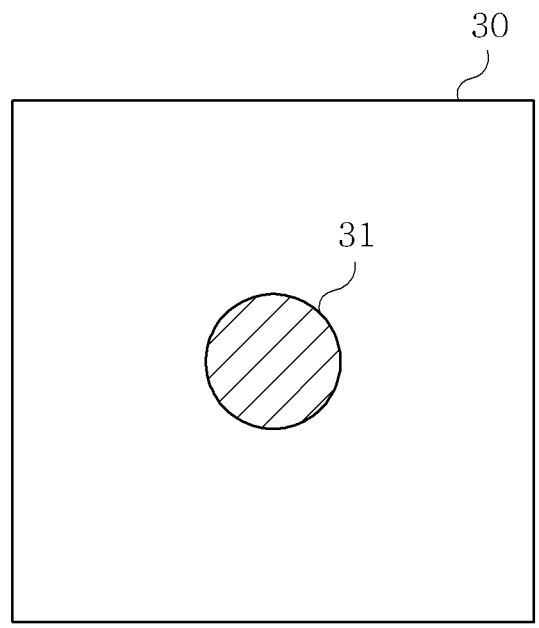
FIGS. 15 to 19 show examples of rear patterns of the meta-structure applied to a terminal device in accordance with an embodiment of the present invention.

First, FIG. 15 illustrates a plan view of an example of the rear pattern 30 for the agglomerative meta-structure MM1, which is characterized by forming a circular pattern 31 in an engraved form. Such a configuration of the rear pattern may generate a parallel inductance connected between coupling capacitance and a ground surface, with an inner area of the circular pattern 31 not being grounded but an outer area of the circular pattern 31 being grounded.

Figure 16:
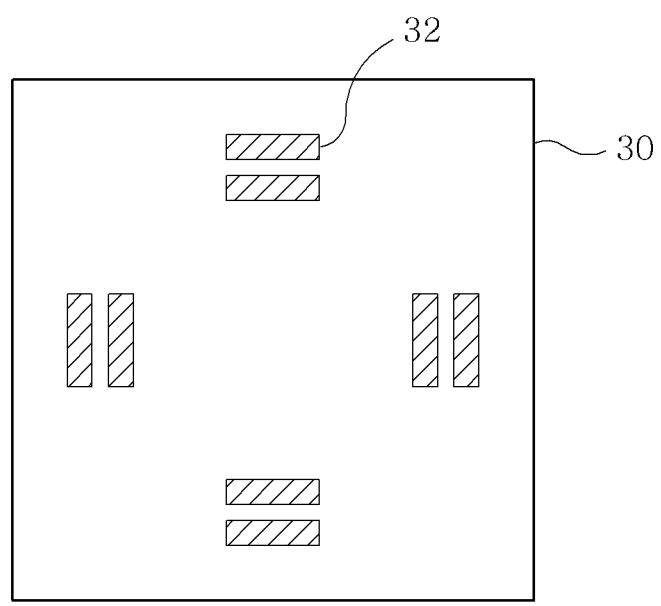

FIG. 16 illustrates a plan view of another example of the rear pattern for the agglomerative meta-structure MM1, which is characterized by forming a plurality of slit patterns 32 in an engraved form. The slit patterns 32 are formed by patterning pairs of two slit patterns so that the slit patterns in pairs are faced each other with a space between them to secure a capacitance component.

Figure 17:
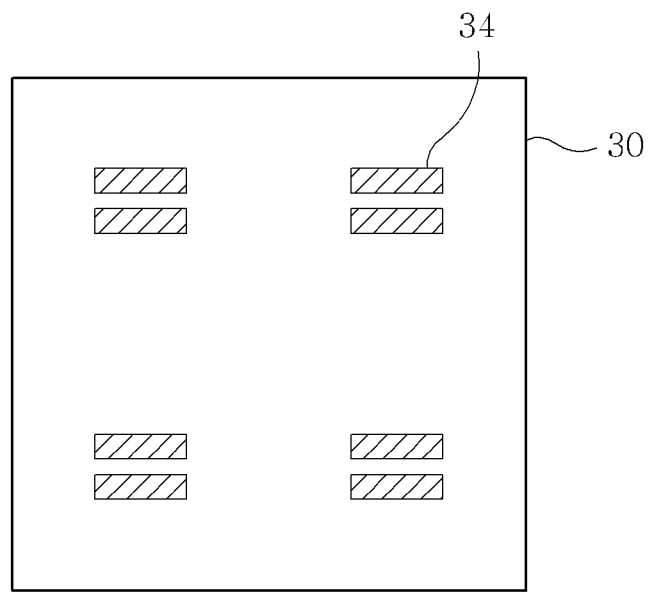

FIG. 17 shows another example that a plurality of slit patterns 34 is formed in an engraved fashion on the agglomerative meta-structure MM1, which is similar to the example of FIG. 16. The slit patterns 34 are made in an engraved form at locations corresponding to the inner patterns 22a' illustrated in FIG. 11.

Figure 18:
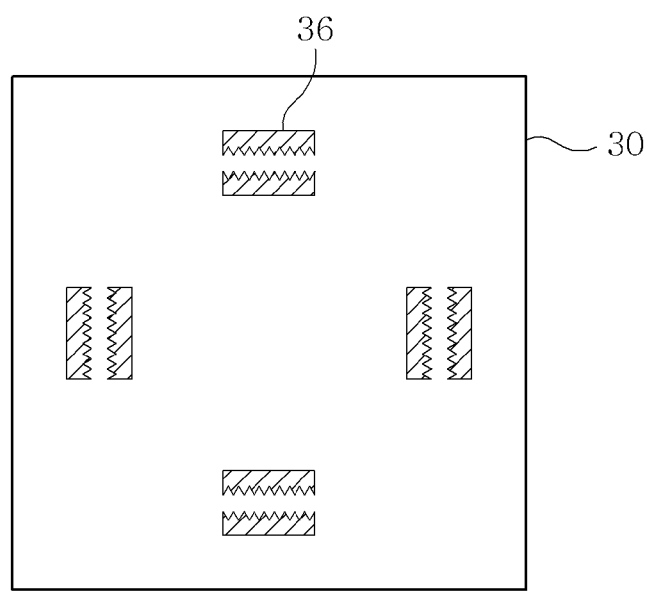

FIG. 18 illustrates a plan view of another example of the rear pattern for the agglomerative meta-structure MM1, similarly to the example of FIG. 16. When forming a plurality of engraved slit patterns 36, two slit patterns 36 in each pair are implemented so that they are faced each other with the saw-toothed shapes being put on the opposite sides.

Figure 19:
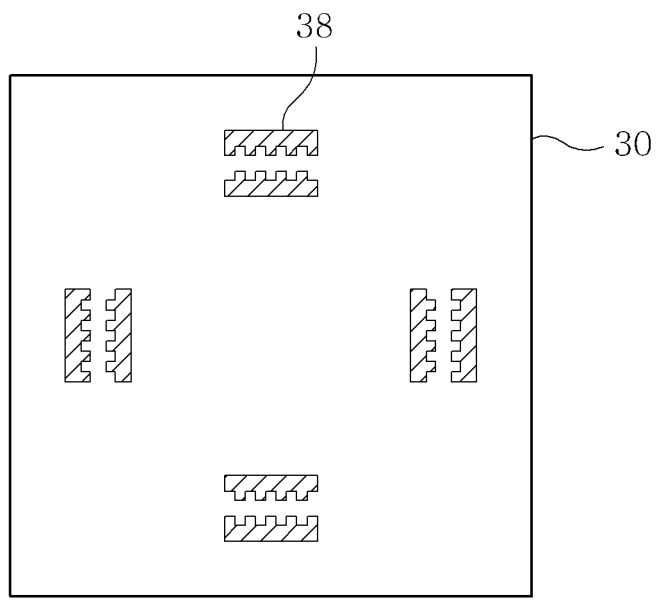

FIG. 19 illustrates a plan view of another example of the rear pattern for the agglomerative meta-structure MM1, similarly to the example of FIG. 16. When forming a plurality of engraved slit patterns 38, two slit patterns 38 in each pair are implemented so that they are facing each other with concave-convex shapes being put on the opposite sides.

In the examples of FIG. 18 and FIG. 19, the pairs of two slit patterns are patterned so that the two slit patterns in each pair are arranged with a space between them to secure a capacitance component while facing the saw-toothed shapes or the concave-convex shapes each other.

Further, it will be easily appreciated by those skilled in the art that the examples of FIGS. 18 and 19 are formed in the engraved form at locations corresponding to the inner patterns 22a' of the example illustrated in FIG. 11.

Figure 20:
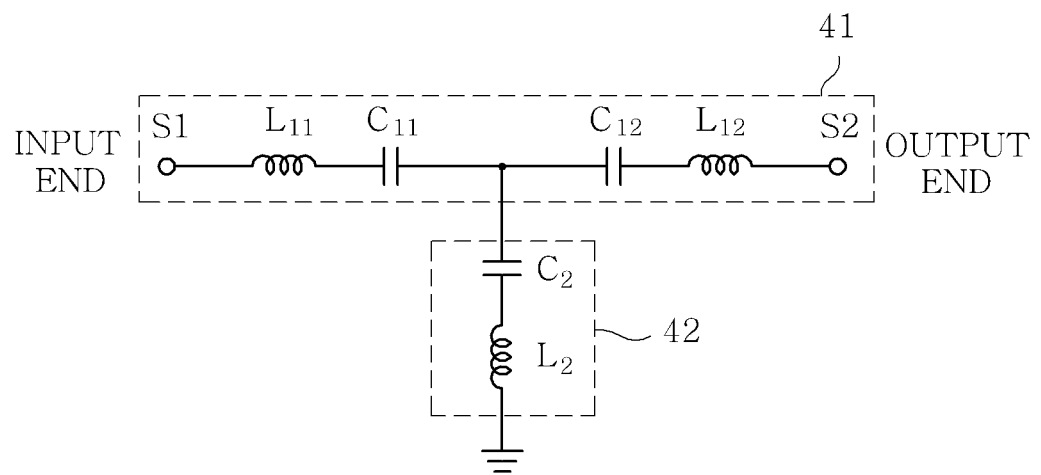
FIG. 20 illustrates an equivalent circuit of the meta-structure applied to a terminal device in accordance with an embodiment of the present invention.

FIG. 20 illustrates an equivalent circuit of the meta-structure applied to a terminal device in accordance with an embodiment of the present invention.

As illustrated in FIG. 20, an electromagnetic wave absorber based on the meta-structure includes a first pattern layer 41 connected in serial between an input end S1 and an output end S2 and a second pattern layer 42 connected in parallel to the first pattern layer 41 between the input end S1 and the output end S2.

In the embodiment, the first pattern layer 41 corresponds to the front pattern of the agglomerative meta-structure MM1 and the second pattern layer 42 corresponds to the rear pattern of the agglomerative meta-structure MM1.

As illustrated in FIG. 20, the first pattern layer 41 includes a first inductor $L_{11}$, a first capacitor $C_{11}$ connected in series to the first inductor $L_{11}$, a second capacitor $C_{12}$ connected in series to the first capacitor $C_{11}$, and a second inductor $L_{12}$ connected in series to the second capacitor $C_{12}$.

Also, the second pattern layer 42 includes a third capacitor $C_2$ connected in parallel between the first and the second capacitors $C_{11}$ and $C_{12}$, and a third inductor $L_2$ connected in series to the third capacitor $C_2$.

Figure 21:
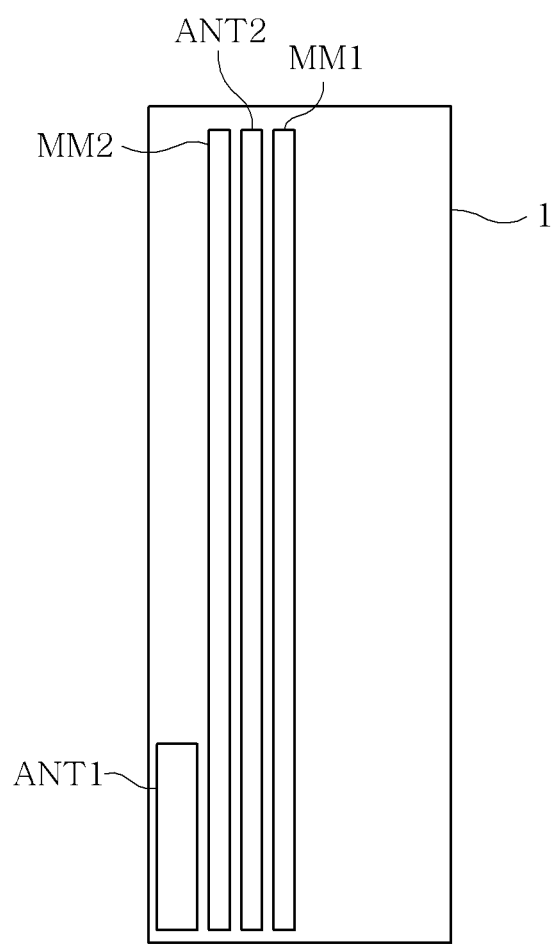
FIG. 21 is a schematic block diagram a terminal device having the meta-structure in accordance with another embodiment of the present invention.

FIG. 21 is a schematic block diagram a terminal device having the meta-structure in accordance with another embodiment of the present invention. The terminal device includes a housing 1, a communication antenna ANT1, an agglomerative meta-structure MM1, a collective meta-structure MM2, and a charging antenna ANT2.

The terminal device applied to an embodiment of FIG. 21, similarly to that of FIG. 2, may include a variety of communication terminals and multimedia terminals such as smart phones, notepads, Bluetooth receivers and the like. However, it should be noted that these terminal devices are merely illustrative for the explanation purpose of the embodiments and are not limited to such particular terminal devices As shown in FIG. 21, the housing 1 is used to accommodate the terminal device and may typically refer to a frame in the shape of a box enclosing the terminal device.

The communication antenna ANT1 is installed in a given region in the housing 1 to receive and transmit electromagnetic waves.

The communication antenna ANT1 may include an antenna for use in wide area communications such as WCDMA (Wideband Code Division Multiple Access), LTE (Long Term Evolution) and the like and an antenna for use in local area communications such as Wi-Fi (Wireless Fidelity), Bluetooth and the like, but is not limited to communication antennas for use in a specific function inclusive of the antennas as set forth above.

The agglomerative meta-structure MM1, which is applied to the embodiment of the present invention, is installed in another region spaced by a prefixed distance from the given region within the housing 1 to agglomerate the electromagnetic waves received from the communication antenna ANT1.

The collective meta-structure MM2, which is applied to the embodiment of the present invention, is installed in further another region spaced by a prefixed distance from the given region within the housing 1 to collect wireless power received from the outside.

The charging antenna ANT2 is disposed between the agglomerative meta-structure MM1 and the collective meta-structure MM2 to charge the wireless power received from the outside.

Figure 22:
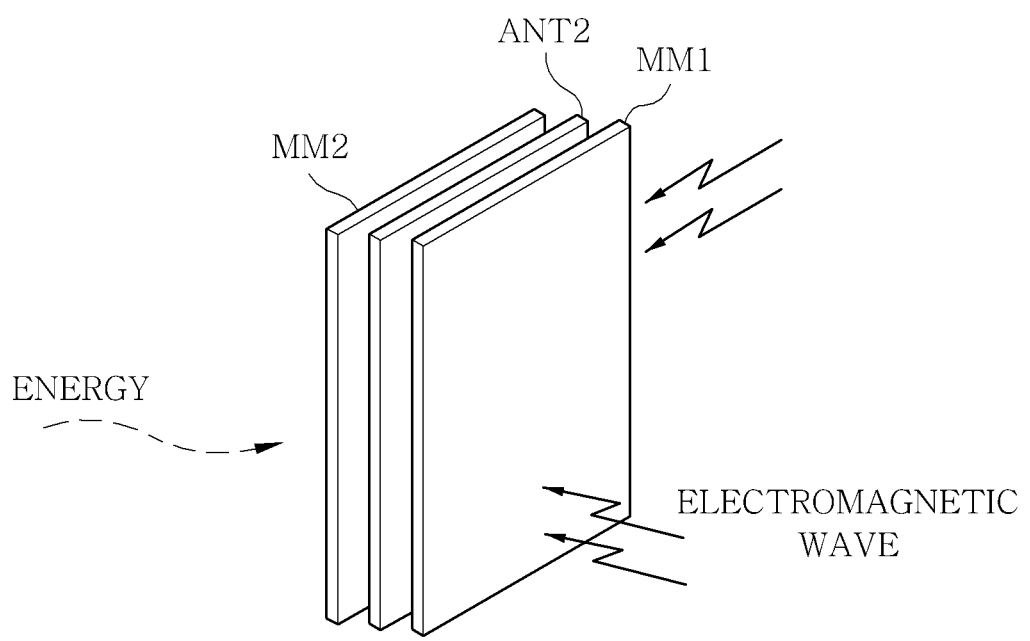
FIG. 22 shows a perspective view of the terminal device depicted in FIG. 2.

FIG. 22 shows a perspective view of the terminal device shown in FIG. 21. The agglomerative meta-structure MM1 is disposed toward a direction to which the electromagnetic waves are agglomerated and the collective meta-structure MM2 is disposed toward a direction to which energy is collected.

The agglomerative meta-structure MM1 and the collective meta-structure MM2, which are applied to the embodiment of FIG. 21, are implemented using the meta-structure having the same patterns as illustrated in FIGS. 3 to 20 and, therefore, the description of the patterns will be omitted.

As described above, in accordance with the embodiments of the present invention, a technology is implemented capable of shielding the leakage radio waves occurring in the terminal device by employing the meta-structure having a radio wave absorption capability in a handheld terminal, etc., minimizing the effect to the human body by the electromagnetic waves occurred from the terminal device, and combining an electromagnetic wave agglomerative function with a wireless power collection function by coupling the meta-structure with a wireless power transmission system. Accordingly, since the meta-structure is designed to have a property to absorb a frequency at specific band, it is possible not to deform the expensive materials and the molecular structure of the expensive materials incorporated in an existing absorber, and not to incur any problems in processes and practical uses and widespread use of technologies. Particularly, since it is possible to minimize the effect on the human body of the radio waves radiated from wireless communication electronic devices, radio communication electronic devices harmless to the human body may be implemented when it is applied to packaging technologies or the like. Besides, in addition to the meta-structure for the electromagnetic wave agglomeration, the embodiment further provides a collective meta-structure for transmitting the wireless power, which can be readily applied to a terminal device having a wireless power transmission technique applied thereto.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A terminal device comprising:
   a housing;
   a communication antenna installed in a first region in the housing and configured to transmit and receive electromagnetic waves; and
   an agglomerative meta-structure installed in a second region spaced from the first region in the housing and configured to agglomerate the electromagnetic waves received from the communication antenna, wherein the agglomerative meta-structure comprises:
   a first pattern layer connected in series between an input end and an output end of the agglomerative meta-structure; and
   a second pattern layer connected in parallel between the input end and the output end.

2. The terminal device of claim 1, wherein the first pattern layer has an equivalent circuit, wherein the equivalent circuit comprises:
   a first inductor;
   a first capacitor connected in series to the first inductor;
   a second capacitor connected in series to the first capacitor; and
   a second inductor connected in series to the second capacitor,
   wherein the second pattern layer comprises:
   a third capacitor connected in parallel between the first capacitor and the second capacitor; and
   a third inductor connected in series to the third capacitor.

3. The terminal device of claim 1, wherein the first pattern layer comprises:
   an edge pattern formed along the inside of an outer surface of the agglomerative meta-structure; and
   extended patterns extending from given points or corners of the respective sides of the edge pattern toward the inside of the agglomerative meta-structure.

4. The terminal device of claim 3, wherein the extended patterns have extended ends that are centered on a middle of the agglomerative meta-structure and are faced to one another.

5. The terminal device of claim 3, wherein each of the extended patterns has a concave-convex structure.

6. The terminal device of claim 1, wherein the agglomerative meta-structure comprises:
   an edge pattern formed along the inside of an outer surface of the agglomerative meta-structure;
   extended patterns extending from the corners of the edge pattern toward the inside of the agglomerative meta-structure; and
   at least one inner pattern connected to each of the extended patterns, wherein the inner patterns have extended ends that are centered to a middle of the agglomerative meta-structure and are faced to one another, and the inner patterns have a type of a square, and each of the extended ends is configured to extend from a corner of the square.

7. The terminal device of claim 6, wherein the extended patterns have extended ends that are centered to a middle of the agglomerative meta-structure and are faced to one another.

8. The terminal device of claim 1, wherein the agglomerative meta-structure comprises:
   an edge pattern formed along the inside of an outer surface of the agglomerative meta-structure;
   first extended patterns extending from given points on respective sides of the edge pattern toward the inside of the agglomerative meta-structure, wherein the first extended patterns have extended ends that are centered to a middle of the agglomerative meta-structure and are faced to one another; and
   second extended patterns extending from the corners of the edge pattern toward the inside of the agglomerative meta-structure.

9. The terminal device of claim 8, wherein the second extended patterns have a concave-convex structure.

10. The terminal device of claim 1, wherein the agglomerative meta-structure comprises:
    an edge pattern formed along the inside of an outer surface of the agglomerative meta-structure;
    first extended patterns extending from given points on respective sides of the edge pattern toward the inside of the agglomerative meta-structure, wherein the first extended patterns have extended ends that are centered to a middle of the agglomerative meta-structure and are faced to one another;
    second extended patterns extending from the corners of the edge pattern toward the inside of the agglomerative meta-structure; and
    at least one inner pattern connected to each of the second extended patterns, wherein the inner patterns have extended ends that are centered to a middle of the agglomerative meta-structure and are faced to one another, and the inner patterns have a type of a square, and each of the extended ends is configured to extend from a corner of the square.

11. The terminal device of claim 1, wherein the agglomerative meta-structure comprises:
    an edge pattern formed along the inside of an outer surface of the agglomerative meta-structure;
    first extended patterns extending from given points on sides of the edge pattern toward the inside of the agglomerative meta-structure, wherein the first extended patterns have extended ends that are centered to a middle of the agglomerative meta-structure and are faced to one another;
    second extended patterns extending from corners of the edge pattern toward the inside of the agglomerative meta-structure; and
    at least one inner pattern connected to each of the second extended patterns, the inner pattern having a plurality of unit-cell structures, wherein the inner patterns have extended ends that are centered to a middle of the agglomerative meta-structure and are faced to one another, and the inner patterns have a type of a square, and each of the extended ends is configured to extend from a corner of the square.

12. The terminal device of claim 1, wherein the agglomerative meta-structure comprises:
    an edge pattern formed along the inside of an outer surface of the agglomerative meta-structure;
    extended patterns extending from respective corners or given points on respective sides of the edge pattern toward the inside of the agglomerative meta-structure; and
    inner patterns in the shape of a spiral connected to the extended patterns or connected to on at least two points on the extended patterns having a plurality of unit cell structures.

13. The terminal device of claim 12, wherein spaces between the inner patterns are configured to induce capacitance.

14. The terminal device of claim 12, wherein the second pattern layer has slit patterns or a circular pattern of an engraved form.

15. The terminal device of claim 14, wherein the slit patterns are formed by patterning pairs of at least two slit patterns so that the two slits are facing each other with a space between them.

16. The terminal device of claim 15, wherein the at least two patterns are configured to face saw-toothed shapes being put on the opposite sides.

17. The terminal device of claim 15, wherein the at least two patterns are configured to face concave-convex forms being put on the opposite sides.

18. The terminal device of claim 1, wherein the agglomerative meta-structure has a property that either a dielectric constant or permeability is negative.

19. The terminal device of claim 1, further comprising a wireless power transceiving unit.

20. The terminal device of claim 19, wherein the wireless power transceiving unit comprises:
    a collective meta-structure configured to collective wireless power received from an outside; and
    a charging antenna arranged between the collective meta-structure and the agglomerative meta-structure and configured to charge the wireless power.

* * * * *